United States Patent
De Rosenzweig Pages (10) Patent No.: US 11,448,540 B2
(45) Date of Patent: Sep. 20, 2022

(54) HIGH RESOLUTION ELLIPTICAL GEAR FLOWMETER

(71) Applicant: Carlos Augusto De Rosenzweig Pages, Nuevo Leon (MX)

(72) Inventor: Carlos Augusto De Rosenzweig Pages, Nuevo Leon (MX)

(*) Notice: Subject to any disclaimer, the term of this patent is extended or adjusted under 35 U.S.C. 154(b) by 0 days.

(21) Appl. No.: 17/145,347

(22) Filed: Jan. 10, 2021

(65) Prior Publication Data

US 2022/0221318 A1   Jul. 14, 2022

(51) Int. Cl.
  *G01F 3/10*    (2006.01)
  *G01F 15/06*   (2022.01)

(52) U.S. Cl.
  CPC .............. *G01F 3/10* (2013.01); *G01F 15/066* (2013.01)

(58) Field of Classification Search
  CPC ................................. G01F 3/10; G01F 15/066
  USPC ........................................................... 73/261
  See application file for complete search history.

(56) References Cited

U.S. PATENT DOCUMENTS

| | | | | |
|---|---|---|---|---|
| 4,579,008 A * | 4/1986 | Bohm | .................... | G01P 3/4815 |
| | | | | 73/261 |
| 5,992,230 A * | 11/1999 | Scarpa | .................... | F04C 2/126 |
| | | | | 418/206.5 |
| 2009/0126478 A1* | 5/2009 | Moilanen | .................. | G01F 3/10 |
| | | | | 73/261 |
| 2009/0314115 A1* | 12/2009 | Breeser | .................... | G01F 3/10 |
| | | | | 74/457 |
| 2018/0306616 A1* | 10/2018 | Gillette, II | ......... | G01N 33/2888 |

* cited by examiner

*Primary Examiner* — Nathaniel T Woodward (57) ABSTRACT

A flow meter, includes a casing, having a central cavity flow communication with an inlet and an outlet conduit; first and second toothed intermeshing oval gears, respectively rotatably supported in the central cavity via a primary support shaft and a secondary support shaft. The first oval gear has an upper surface provided with a protrusion and a magnet, with at least a portion of the magnet arranged within said protrusion, said magnet centered with respect to an axis of rotation of the first gear, and rotating concentrically with respect to the axis of rotation of the first gear; The flowmeter further includes a top cap having an interior cavity; in which a sensor is arranged, so that when the cap is placed on the casing of the flowmeter, the sensor or encoder is situated above the magnet of the first gear. The cap has a bottom surface with a zone of reduced thickness defining a lower recess arranged below the inner cavity of the cap, so that the projection of the first gear is received in the lower recess, so as to aligning and bring the magnet in close proximity with the sensor or encoder thereby avoiding pressure flexing.

16 Claims, 7 Drawing Sheets

HIGH RESOLUTION ELLIPTICAL GEAR FLOWMETER

BACKGROUND

Gear flowmeters are well known, and generally have a magnetic sensor which, depending on the number of magnets, detects from one to four pulses for each revolution of the gear. Known gear flow meters have low resolution, and are generally used for handling products in large quantities and are not suitable for dosing products with great precision.

Document EP1889014 refers to an oval gear meter for volume flow measurement comprising a housing with an oval gear chamber with a fluid inlet and a fluid outlet, a pair of oval gear wheels positioned in the chamber and together forming an intermixed or non-intermixed involutional toothing, and a magneto-reactive contactless sensor positioned outside the chamber. At least one of the oval sprockets is provided with at least one permanent magnet to form a trigger wheel, the sensor is positioned in an appropriate position with respect to the trigger wheel so that the sensor is adapted to measure the rotation of oval sprockets measuring the rotation of the trigger wheel, it has a firing wheel provided with a permanent magnet that generates a generally homogeneous magnetic field along an axis of symmetry of the firing wheel so that the magnetic field it is generally symmetrical with respect to the axis of rotation of the trigger wheel.

Document CN110987104, discloses a flow meter that includes a housing with a water inlet at one end and a water outlet at the other end, a first rotor and a second rotor, which are provided in the preset installation cavity of the casing, the first rotor and the second rotor are rotatably connected to the casing through a rotating shaft, the first rotor and the second rotor are meshed with each other through a gear structure provided on the outer peripheral edge, provide magnetic parts on the first rotor or the second rotor, with this arrangement, it is possible to form a rotating torque with respect to the first rotor and the second rotor when water flows, and push the first rotor and the second rotor to rotate.

Document MX2013001231 refers to a fluid flow meter and methods for measuring different aspects of fluid flow with a non-contact sensor, it is provided with a fluid chamber that is sealed with a cover portion that carries the non-contact sensor, The flow meter is configured to transmit visible light and avoid or reduce the transmission of ambient radiation to the flow meter to decrease the likelihood that it can adversely affect a non-contact optical sensor used to detect gear movement within the chamber.

WO2009154803 relates to a flow meter with an oval gear set for use in a flow meter comprising first and second gears that are identical to each other and that are configured to engage at a fixed center-to-center distance, such that the first and second gears mesh in all angular positions, each gear of the oval gear set comprises a hub and a plurality of gear teeth, the hub comprises an oval member having a major axis and a minor axis extending to Through a hub center, each of the gear teeth has a pair of contact surfaces with involute curve circular profiles.

In addition, flowmeters with elliptical gears that include magnets housed in the gears and sensors were found, such as those disclosed in documents US2020011719, US2019033115, US2010199758, DE202017106253U, U.S. Pat. No. 9,835,482, and EP0129232, however, none of the flowmeters disclosed in the documents cited above They have centering pins to precisely align the magnet and magnetic sensor, nor do they include gears with circular teeth, and no state-of-the-art flow meter has a thickness reduction that defines a recess in the cap to receive the top of the gear. primary that is embedded in the magnet, and does not include a clamp for opening and cleaning.

SUMMARY OF THE INVENTION

According to one aspect of the present invention a flowmeter includes a casing, having a central cavity, the central cavity in flow communication with an inlet and an outlet conduit for conducting a fluid into and out of the central cavity; first and second intermeshing toothed oval gears, respectively rotatably supported in the central cavity via a primary support shaft and a secondary support shaft, said primary and secondary support shaft supported in a bottom of the central cavity, said first oval gear having an upper surface provided with a protrusion, the first gear further having a magnet situated in an upper portion of the first gear and centered with respect to an axis of rotation of the first gear, and rotating concentrically with respect to the axis of rotation of the first gear, with at least a portion of the magnet situated within said protrusion; and a cap for closing the central cavity, the cap having an interior cavity housing an electronic board with a sensor or magnetic encoder arranged at a base of the interior cavity, so that when the cap is placed on the casing of the flowmeter, the sensor or encoder is arranged above the magnet of the first gear, said cap further having a bottom surface with a zone of reduced thickness defining a lower recess arranged below the inner cavity of the cap, so that the protrusion of the first gear is received in said lower recess, so as to align and bring the magnet in close proximity with the sensor or encoder thereby avoiding pressure flexing, that is, it maintains the internal geometry of the cavity without bending due to the pressure that the liquid to be measured could cause.

BRIEF DESCRIPTION OF THE FIGURES

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
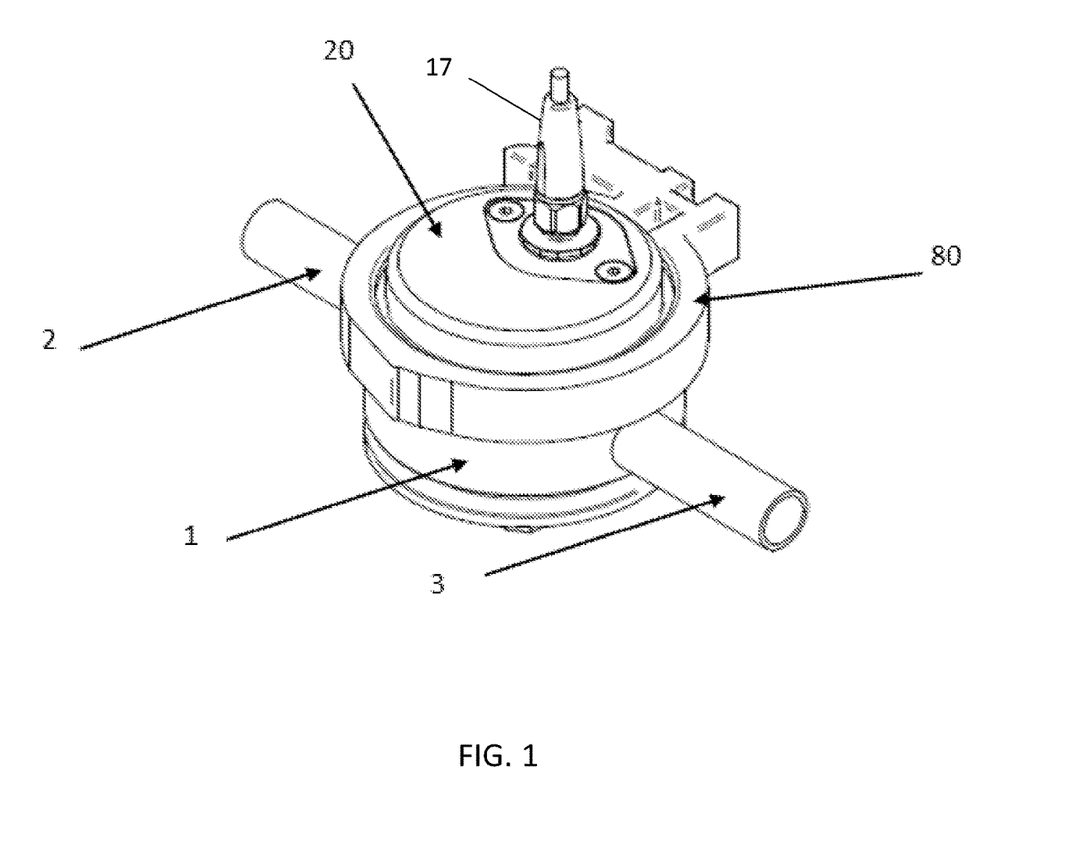
FIG. 1 is a top perspective view of the flowmeter according to the present invention.
Figure 3:
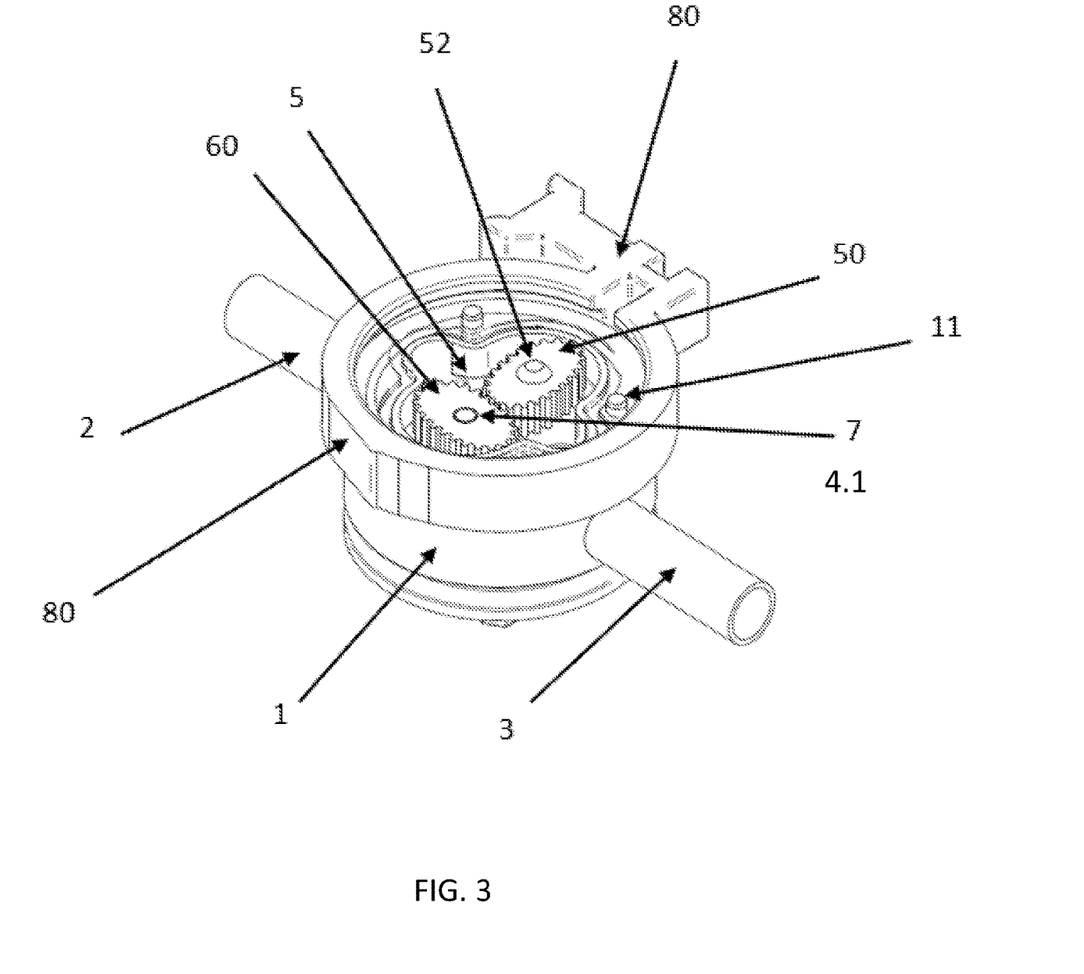
FIG. 3 shows the flowmeter of FIG. 1 with the top cap removed, showing the oval gears.
Figure 4:
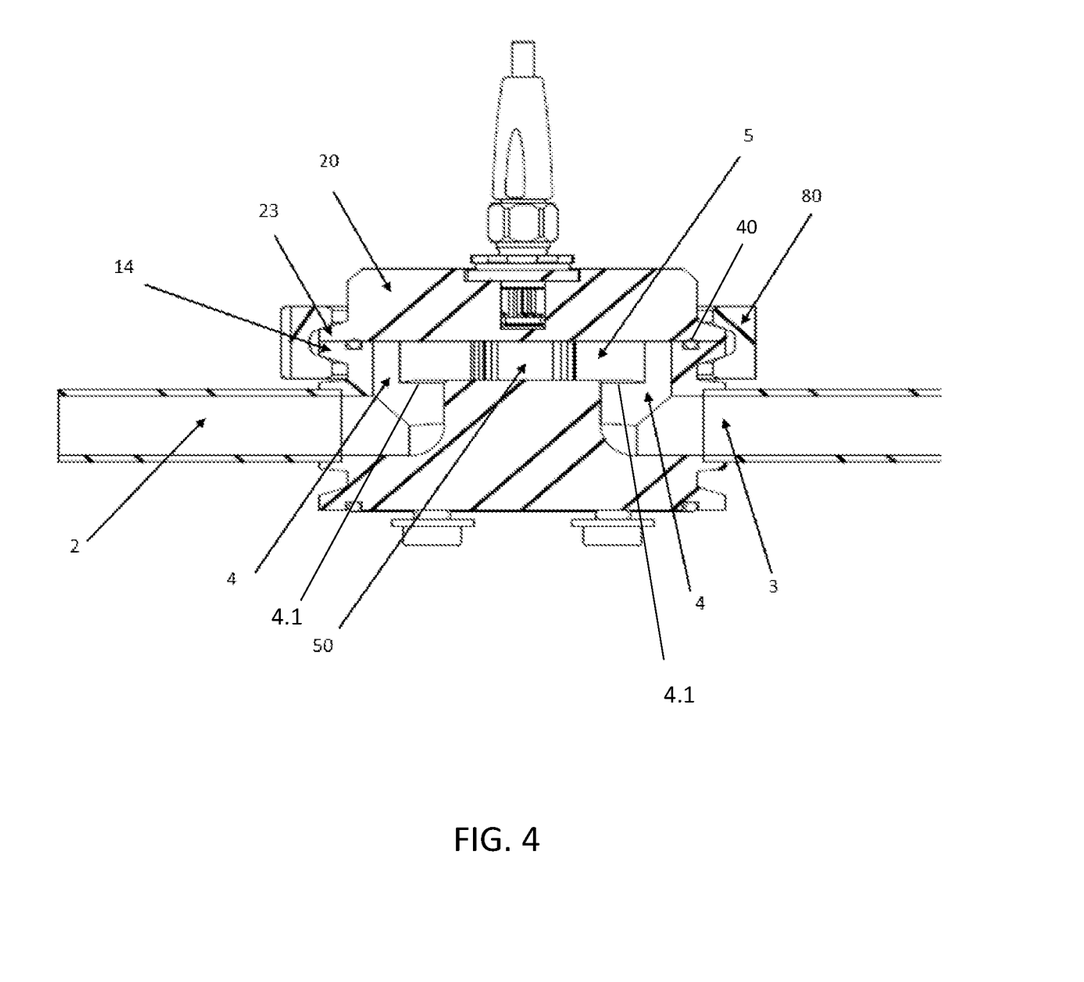
FIG. 4 is a longitudinal sectional view of the flowmeter.
Figure 7:
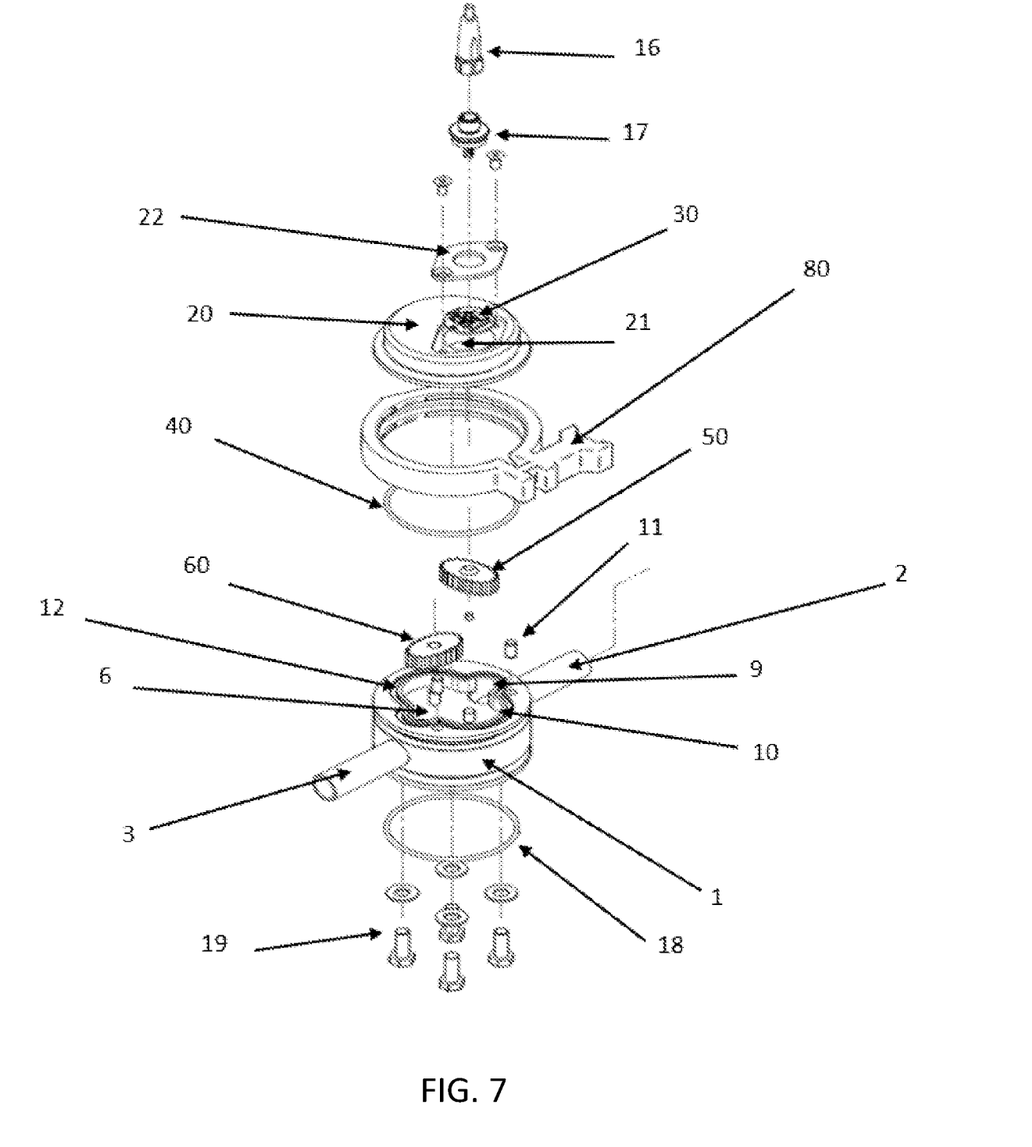
FIG. 7 is a perspective exploded view of the flowmeter of FIG. 1.

Turning now to the drawing, and in particular to FIGS. 1, 3 and 7, there is shown an embodiment of the flowmeter according to the present invention generally indicated by reference numeral 1. FIG. 1 shows a top perspective view of the flowmeter 1. The flowmeter 1 includes a substantially cylindrical casing 1.1 and a cap 20 secured to the casing by a bracket 80. The casing 1.1 has an inlet conduit (2) and an outlet conduit (3) arranged diametrically opposed and collinear with respect to each other for conducting fluid into and out of the central cavity (5). With reference to FIG. 4, the inlet (2) and outlet (3) conduits each have a section 4 which extends vertically upwards inside the casing and opens into the central cavity (5) via entry opening 4.1 (5).

Referring to FIG. 3, the central cavity (5) of the casing 1.1. of the flowmeter 1 has a substantially oval cross-shaped configuration, that is, a first oval and a second oval transverse to the first, where the ends of the second oval are of smaller radius than the ends of the first oval, forming four radial semicircular lobes, two diametrically opposed lobes of smaller radius (9) and two diametrically opposed lobes of larger radius (10), with the lobes of smaller radius (9) coinciding with the entry openings of the orthogonal derivations (4) of the inlet and outlet conduits (2 and 3) into the central cavity (5). The central cavity (5) has a floor (6) where a primary support shaft (7) and a secondary support shaft (8) are arranged parallel to each other.

The casing 1.1 has at its upper edge an upper surface (15) defined in the horizontal plane, which upper surface (15) has a groove (12) perimetrally surrounding the central cavity (5) and with the same configuration as the central cavity for receiving sealing ring (40).

As best shown in FIG. 3, the flowmeter 1 has first and second oval gears (50, 60), which in their lower central part have a cylindrical hole (not illustrated), so that the oval gears (50, 60) are arranged on the primary and secondary support shafts (7 and 8), so that the gears (50, 60) are coupled to each other by means of their teeth (53). The configuration of the teeth (53) is circular defining an undulating profile of the teeth to facilitate cleaning of the gears (50, 60). The oval gears (50, 60) rotate within the lobes of greater radius (10) of the central cavity (5).

Figure 5:
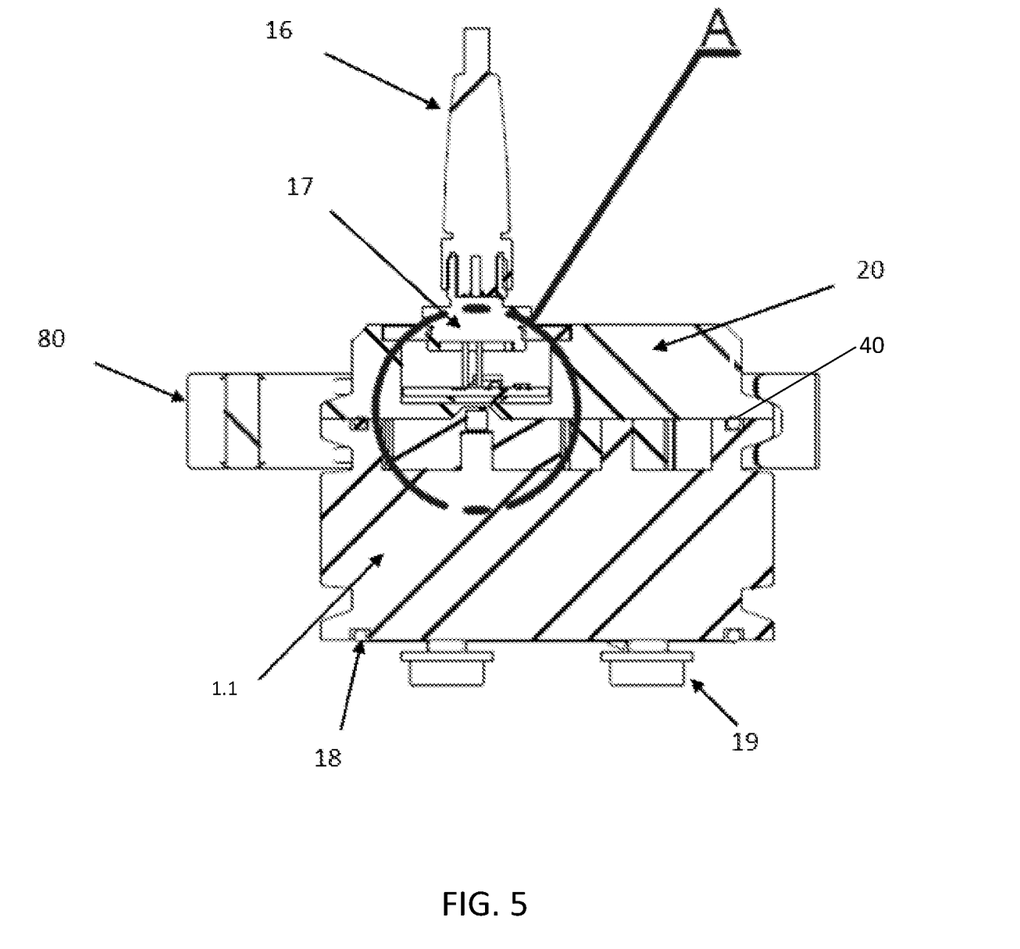
FIG. 5 is a cross-sectional view showing the variable thickness of the lid wall.
Figure 6:
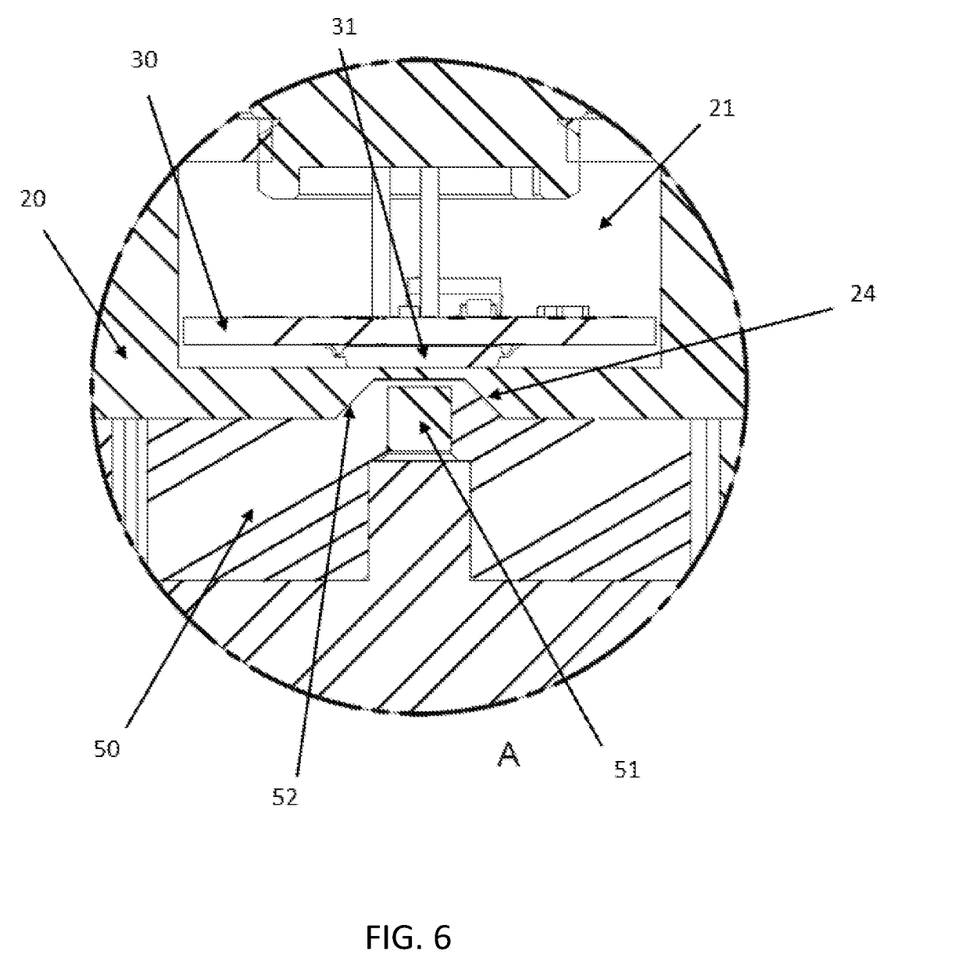
FIG. 6 is an enlarged cross-sectional view showing the variable wall thickness.

Referring to FIGS. 5 and 6, the first oval gear (50) has an upper part in which a magnet (51) is embedded. The first oval gear (50) has a protrusion or projection (52) on its upper surface, in which at least a portion of the magnet (51) is received. The magnet is aligned with the axis of rotation of the first oval gear, or it rotates concentrically to the axis of the first oval gear, which is different from conventional flowmeters, which have magnets at the ends or tips of the gear and are not concentric.

Referring again to FIGS. 1, 2 and 7, the flowmeter 1 has an upper cap (20) with an interior cavity (21) that is covered with an oval plate (22) to allow for quick opening of the cap and access to an electronic board (30) arranged in the interior cavity (21) without having to open the flowmeter 1. The upper cap (20) has a lower flange (23) on its outer surface.

Figure 2:
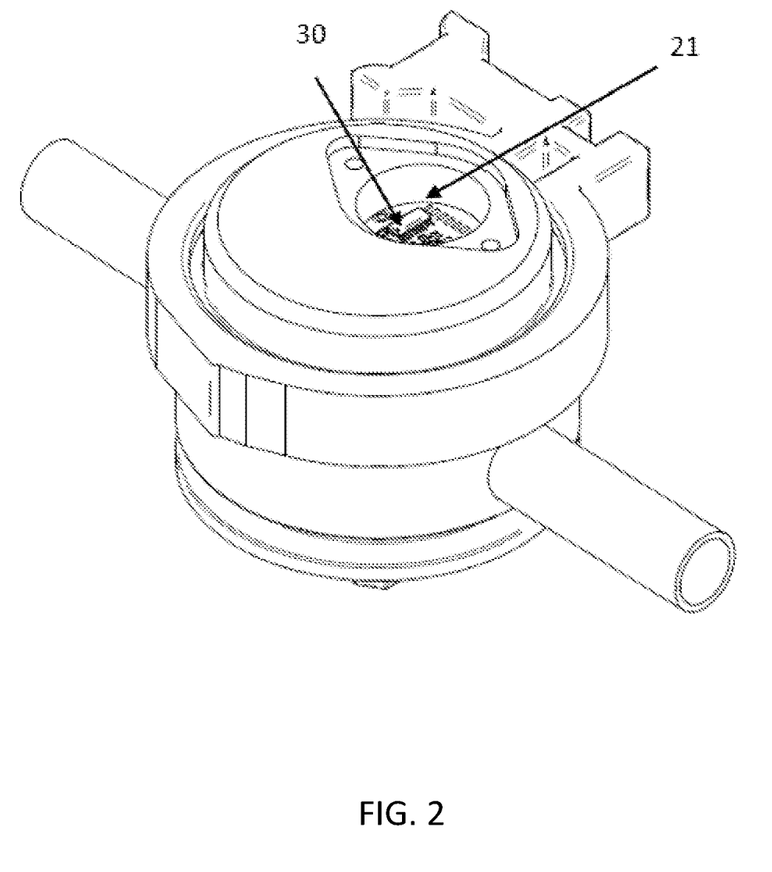
FIG. 2 shows the flowmeter of FIG. 1 with the oval top plate removed.

Furthermore, the casing 1.1 of the flowmeter (1) has in its upper part an outer perimeter groove (13) that defines an upper annular flange (14) coinciding with the lower flange (23) of the cap (20). The flowmeter further includes a clamp (80) having an internal annular groove (81) where the upper flange (14) of the casing of the flowmeter (1) and the lower flange (23) of the cap (20) are received, so that the flanges (14 and 23) are firmly pressed together, achieving a seal when closing the casing of flowmeter (1) with cap (20). This arrangement enables easy opening of the flowmeter 1 when maintenance is required, with the clamp (80) remaining surrounding the joining edge of the cap (20) with the casing 1.1 of the flowmeter (1).

As shown in FIG. 7, the casing (1.1) of flowmeter (1), on its substantially annular upper surface (15) has centering pins (11) coinciding with centering holes (not illustrated) arranged in the cap (20), which ensures that the cap (20) always remains in the same position with respect to the casing (1.1) of the flowmeter (1), and the cap (20) can be centered easily to achieve proper alignment between the magnet (51) of the first oval gear (50) and a magnetic sensor (31) arranged in the cap (20). The centering pins (11) are arranged outside the sealing ring (40), which surrounds the perimeter of the central cavity (5).

Referring to FIG. 2, an electronic board (30) with sensor or magnetic encoder (31) is arranged at the base of the interior cavity (21) of the cap (20), so that when the cap (20) is placed on the casing (1.1)., the sensor or encoder (31) is situated on top the magnet (51) of the first oval gear (50).

The cap (20) has on its lower surface (25) a zone of decreased thickness, which defines a lower recess (24) with preferably angular walls, arranged below the interior cavity (21) of the cap (20), so that the projection or protrusion (52) of the first oval gear (50), where the magnet (51) is embedded, is housed in the lower recess (24), aligning and bringing the magnet (51) closer to the sensor or encoder (31) to avoid pressure bending. The decreased wall thickness in the cover (20) in the area where the primary gear (50) and the electronic board (30) are arranged, defines a recess (24) with a reduced wall thickness only in the sensing area of the magnet (51) against the sensor (31). This arrangement provides rigidity that prevents deformations due to product pressure and ensures optimal distance between the magnet (51) and the sensor (31), ensuring that there are no deformation leaks and a consequent flow reading error.

The clamp (80) allows for a simple assembly and disassembly of the flowmeter to facilitate opening and cleaning of the flowmeter, and provides a sanitary design and a non-contact sensing system to avoid packing that complicates cleaning.

The design of circular gear teeth (53) provides easy cleaning Not using traditional gear teeth avoids the sharp cavities between teeth, facilitating cleaning.

By using a high-resolution non-contact magnetic encoder (31) integrated with a gear (50) with a central magnet (51), of diametrical field, high resolution can be achieved by rotating the gear (50), which can obtain resolutions greater than 100 pulses per revolution, compared to 4 maximum of traditional flow meters, with which a high resolution can be achieved for accurately dosing products.

In operation of the flowmeter, fluid whose flow is to be measured enters through the inlet conduit (2) passes through the vertical section (4), and enters the cavity (5). The fluid then passes between the gears and the perimeter wall of the central cavity (5), causing rotation of the gears, and then exists via conduit 3. Gear (50) rotates together with the magnet (51) and the angular position of the magnet (51) is detected by the sensor or magnetic encoder (31) which measures the revolutions made by the gear (50) and transforms them into electrical signals.

The centering pins (11) allow easy centering of the cap (20) to achieve adequate alignment between the magnet (51) and the magnetic sensor (31). The centering pins (11) are situated radially outside the sealing ring (40), which follows the path of the groove (12), thus achieving a cleaner cavity with a smaller area of possible contamination.

The flowmeter 1 of the present invention also has an external electrical connector (16) and an electrical connector for the flowmeter (17). The electrical connector of the flowmeter is connected to the electronic board and is arranged on the plate (22) of the cap (20) and the external electrical connector (16) is attached to this flowmeter electrical connector.

At the bottom of the casing of flowmeter (1) a mounting seal (18) and mounting screws (19) are provided to fix the flowmeter on a surface as required.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A flow meter, comprising:
    a casing, having a central cavity, said central cavity in flow communication with an inlet and an outlet conduit for conducting a fluid into and out of the central cavity;
    first and second intermeshing toothed oval gears, respectively rotatably supported in the central cavity via a primary support shaft and a secondary support shaft, said primary and secondary support shaft supported in a bottom of the central cavity, said first oval gear having an upper surface provided with a protrusion, said oval first gear further having a magnet situated in an upper portion of the first oval gear and centered with respect to an axis of rotation of the first oval gear, and rotating concentrically with respect to the axis of rotation of the first gear, with at least a portion of the magnet embedded within said protrusion; and
    a cap for closing the central cavity, said cap having an interior cavity housing an electronic board with a sensor or magnetic encoder arranged at a base of the interior cavity, so that when the cap is placed on the casing of the flowmeter, the sensor or encoder is arranged above the magnet of the first gear, said cap further having a bottom surface with a zone of reduced thickness defining a lower recess arranged below the inner cavity of the cap, so that the protrusion of the first gear is received in said lower recess, so as to align and bring the magnet in close proximity with the sensor or encoder.

2. The flowmeter of claim 1, wherein the first and second gears are oval.

3. The flowmeter of claim 2, wherein the central cavity of the casing of the flowmeter has a perimeter defined by two pairs of diametrically opposed arched lobes, the arched lobes of the first pair defined by a first radius, the arched lobes of the second pair defined by a second radius smaller than the first radius.

4. The flowmeter of claim 3, wherein said arched lobes of the second pair respectively coincide with the inlet and outlet conduits into the central opening.

5. The flowmeter of claim 3, wherein the oval gears rotate within the arched lobes of the first pair.

6. The flowmeter of claim 1, wherein the casing has an upper surface provided with a groove which surrounds a perimeter of the central cavity and corresponds in shape to the perimeter of the central cavity, the flowmeter further comprising a sealing ring received in the groove.

7. The flowmeter of claim 1, wherein said oval gears have a plurality of teeth whose configuration is circular, defining a wavy profile of the teeth to facilitate cleaning of the gears.

8. The flowmeter of claim 1, further comprising a plate closing the interior cavity of the cap for providing access to the electronic card without removal of the cap.

9. The flowmeter of claim 1, wherein said upper cap has an outer surface provided with a lower flange and the casing of the flowmeter has in its upper part an outer perimeter groove that defines an upper annular flange coinciding with the lower flange of the cap.

10. The flowmeter of claim 1, further comprising a clamp clamping the casing and the cap together, via engagement of the upper annual flange of the cap and the lower annual flange of the casing in an internal annular groove of the clamp, wherein a bottom of the cap, firmly presses the upper flange and the lower flange together, resulting in a seal between the cap and the casing.

11. The flowmeter of claim 1, wherein the casing of the flowmeter, on its upper surface has centering pins coinciding with centering holes arranged in the cap.

12. The flowmeter of claim 11, wherein the centering pins are situated radially outside a sealing ring, which surrounds the perimeter of the central cavity.

13. The flowmeter of claim 1, wherein the lower recess has angular walls.

14. The flowmeter of claim 1, wherein the inlet conduit and the outlet conduit are arranged diametrically opposite and collinear relative each other.

15. The flowmeter of claim 1, wherein the casing of the flowmeter is substantially cylindrical.

16. The flowmeter of claim 1, wherein the inlet and outlet conduits extend vertically upwards inside the casing of the flowmeter, leading into the central cavity.

* * * * *